United States Patent [19]
Melgaard et al.

[11] Patent Number: 4,729,246
[45] Date of Patent: Mar. 8, 1988

[54] PRODUCT TESTING SYSTEM

[75] Inventors: Hans L. Melgaard; Wendell L. Schafer, both of Minneapolis, Minn.

[73] Assignee: Despatch Industries, Inc., Minneapolis, Minn.

[21] Appl. No.: 944,204

[22] Filed: Dec. 22, 1986

[51] Int. Cl.⁴ ............................................. G01M 19/00
[52] U.S. Cl. ....................................... 73/865.6; 374/57
[58] Field of Search .......................... 73/865.6; 374/57; 414/222, 223

[56] References Cited

U.S. PATENT DOCUMENTS

| | | | |
|---|---|---|---|
| 2,373,333 | 4/1945 | Onge | 73/865.6 |
| 3,084,454 | 4/1963 | Schueller | 73/865.6 X |
| 3,302,615 | 2/1967 | Tietje | 73/865.6 X |
| 3,469,455 | 9/1969 | Iwata | 73/865.6 |
| 3,714,833 | 2/1973 | Newman | 73/865.6 |
| 3,807,216 | 4/1974 | Lindwedel et al. | 73/865.6 X |

Primary Examiner—Tom Noland
Attorney, Agent, or Firm—James R. Haller

[57] ABSTRACT

A product testing system comprises a housing with at least one opening therein, the housing having an internal, environmentally controlled chamber. Products to be tested are mounted to a product carrier. The latter is carried, in turn, by a product carrier transfer assembly. By means of the vehicle and transfer assembly, the product carrier may be oriented to be received within the housing opening with the products exposed to the environmentally controlled internal housing chamber. In one embodiment, the vehicle traverses a path adjacent one or more housings, and the product carrier transfer assembly rotates, elevates and laterally moves the product carrier to position it in an opening in the housing.

18 Claims, 13 Drawing Figures

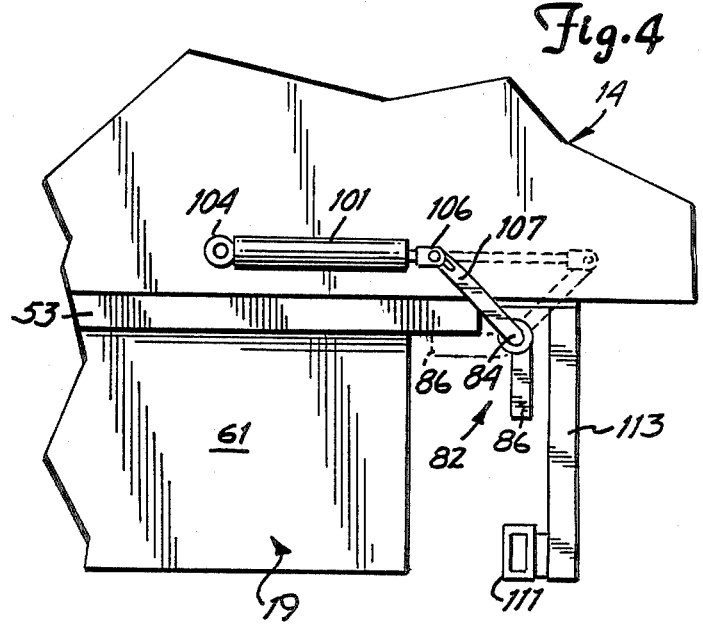
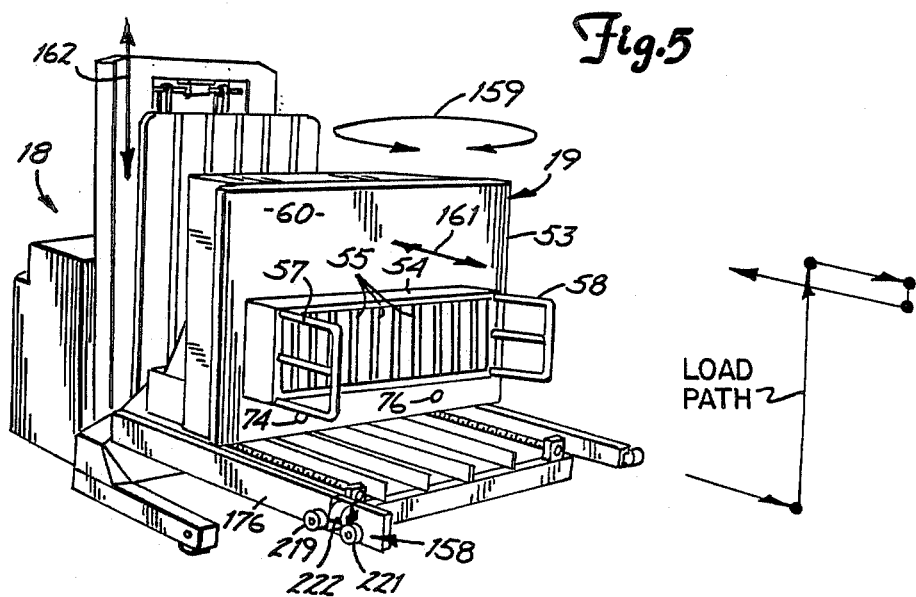

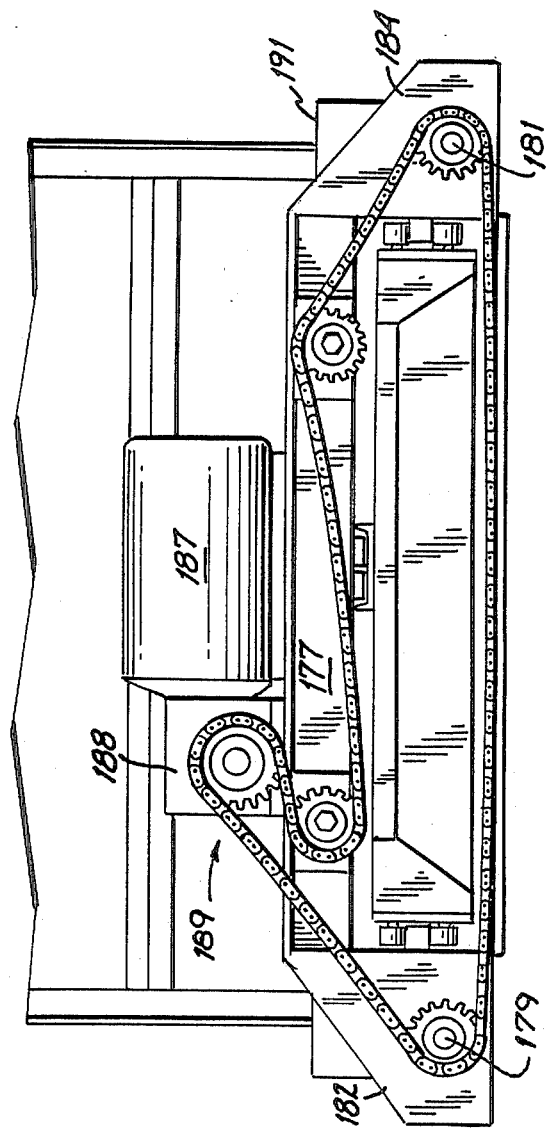

PRODUCT TESTING SYSTEM

FIELD OF INVENTION

The invention is in the field of product testing for monitoring product reliability and failures. The system concurrently monitors a plurality of electrical and electronic compoment products and detects defects in the products.

BACKGROUND OF INVENTION

It is the common industrial practice to randomly test electrical components of the type that are used, for example, in motor vehicles, for reliability and failure. Every component is not so tested; defective components hence find their way into the marketplace. Small numbers of components can be individually tested by placing them in ovens or refrigerators with appropriate electrical leads connected to monitoring instruments. Large numbers of electrical components cannot be efficiently tested in this manner. Visual inspection of electrical components during manufacture and upon completion has improved product reliability. However, visual inspections are not done under adverse environments, such as hot and cold temperatures, and do not monitor the electrical operation or integrity of components.

SUMMARY OF THE INVENTION

The invention is directed to a product testing system that monitors a plurality of products under environmental stress, especially thermal stress, and provides data feedback on product failures. The data identifies and categorizes product failures by type and location. The testing of all products, rather than a representative sampling, greatly improves product reliability and thus reduces overall product costs. Defects in products can be detected and corrected before they are used in the marketplace. The products may be stressed under such controlled environmental conditions as heat, cold and high humidity. Particularly, the products may be cycled between environmental extremes of e.g., temperature. The products may be subjected to rapidly flowing gases and fluids and to gases carrying particulate matter. Interrupted fluid flows can also be used to subject the products to mechanical vibrations.

The product testing apparatus has an environmental controlled enclosure providing a chamber for establishing selected environmental conditions used to test the products. The enclosure is a housing having at least one wall with at least one access opening into the chamber. A vehicle carrying a product carrier transports the product carrier to a position adjacent an opening in the wall. A product carrier transfer assembly mounted on the vehicle is used to place the product carrier in the opening to expose the products to the environmental conditions within the chamber.

The transfer assembly is operable to rotate, elevate, and longitudinally, horizontally move the product carrier to position it in a selected opening in the wall. Co-operating rail and guide means comprising rails attached to the enclosure and guides on the product transfer assembly facilitate the alignment of the product carrier with the opening. Horizontal guide means on the enclosure and product carrier establish the vertical positioning of the product carrier relative to the opening in the wall. The electrical connectors on the enclosure and product carrier interface with each other to couple each product with a console having integrated electronics for power testing, e.g., cycling, of the products.

Locking devices operatively associated with the housing are used to retain the product carrier on the wall with the products located in the chamber environment. The air moving in the chamber has substantially uniform velocity and temperature. This insures quick product temperature recovery and minimum soak time. Uniform and repeatable thermal stress may be applied at each product location.

DESCRIPTION OF DRAWING

FIG. 4 is an enlarged sectional view taken along line 4—4 of FIG. 3;

FIG. 5 is a perspective view of the vehicle product transfer assembly and product carrier;

FIG. 13 is an end view of the product transfer assembly and product carrier taken along line 13—13 of FIG. 12.

DESCRIPTION OF PREFERRED EMBODIMENTS

Figure 1:
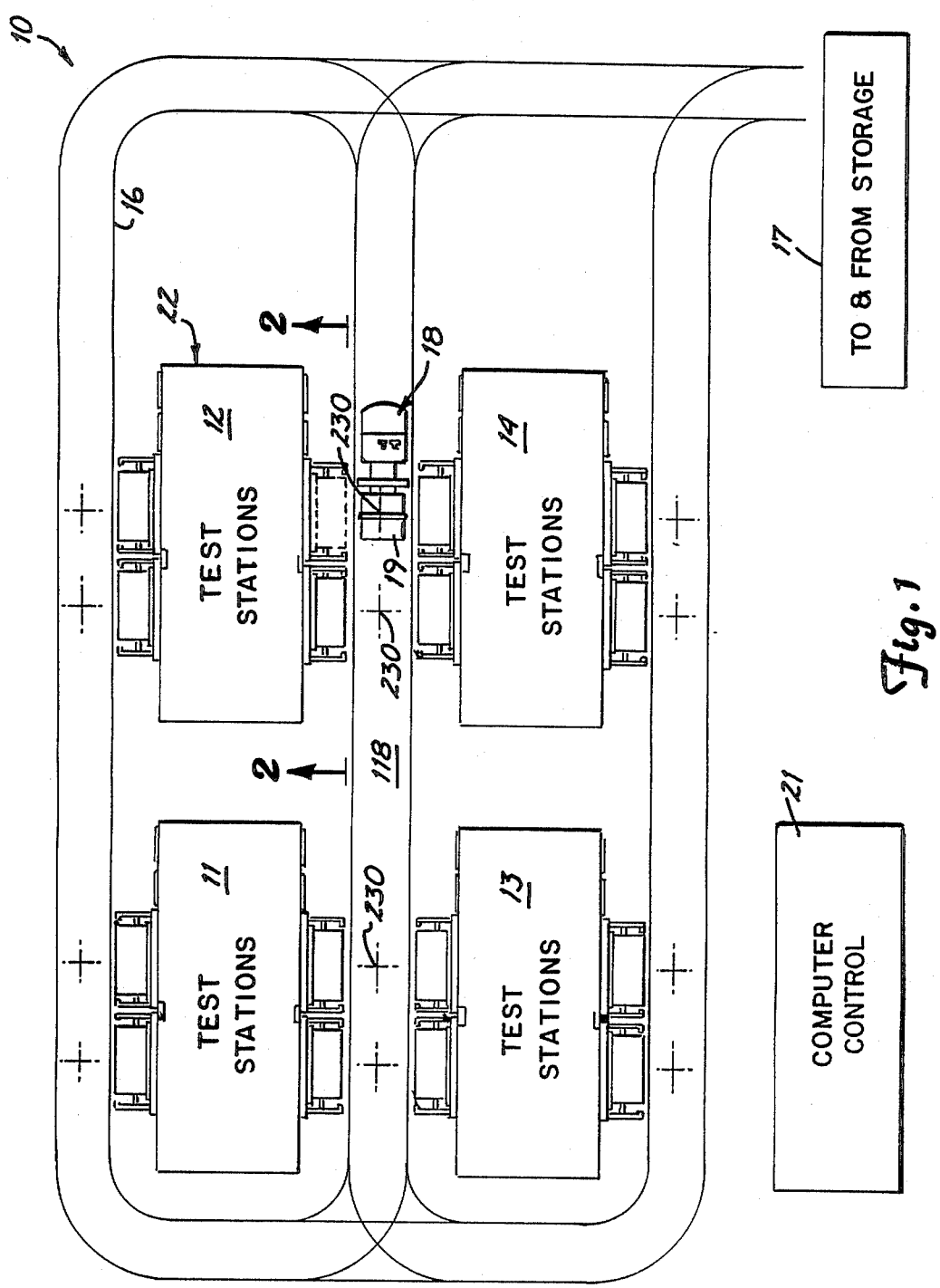
FIG. 1 is a diagrammatic view of the product testing system of the invention.

Referring to FIG. 1, there is shown the product testing system of the invention used for environmental testing of products, such as electronic components for motor vehicles or computers. Product testing system 10 has a plurality of test stations 11, 12, 13 and 14 located adjacent a track or guideway typified as path 16. Path 16 leads to a storage area 17 for the tested and untested products. Product testing system 10 is used to subject a plurality of products to controlled environmental conditions, such as heat, cold, high and low humidity, and rapid flowing gas and fluid. The following description is directed to a product testing system that subjects products to heat and cold for selected periods of time. The environment in the system can be cycled between temperatures of e.g., 120° C. to minus 40° C. The products are electrical components and devices that are connected to a power supply to test the operation and failure thereof during the test procedure. Other types of products and equipment can be tested with testing system 10.

A vehicle indicated generally at 18 moves along path 16 to transport product to and from the several test stations and storage area 17. Vehicle 18 transports a product carrier 19 adapted to support a plurality of products, such as electrical components for motor vehicles. The entire system is controlled with a computer controller 21.

Test stations 11 to 14 are identical in structure and function. Each test station is adapted to receive a plurality of product carriers so that the products supported therefrom can be subjected to a temperature testing. The following description limited to test station 12.

Figure 2:
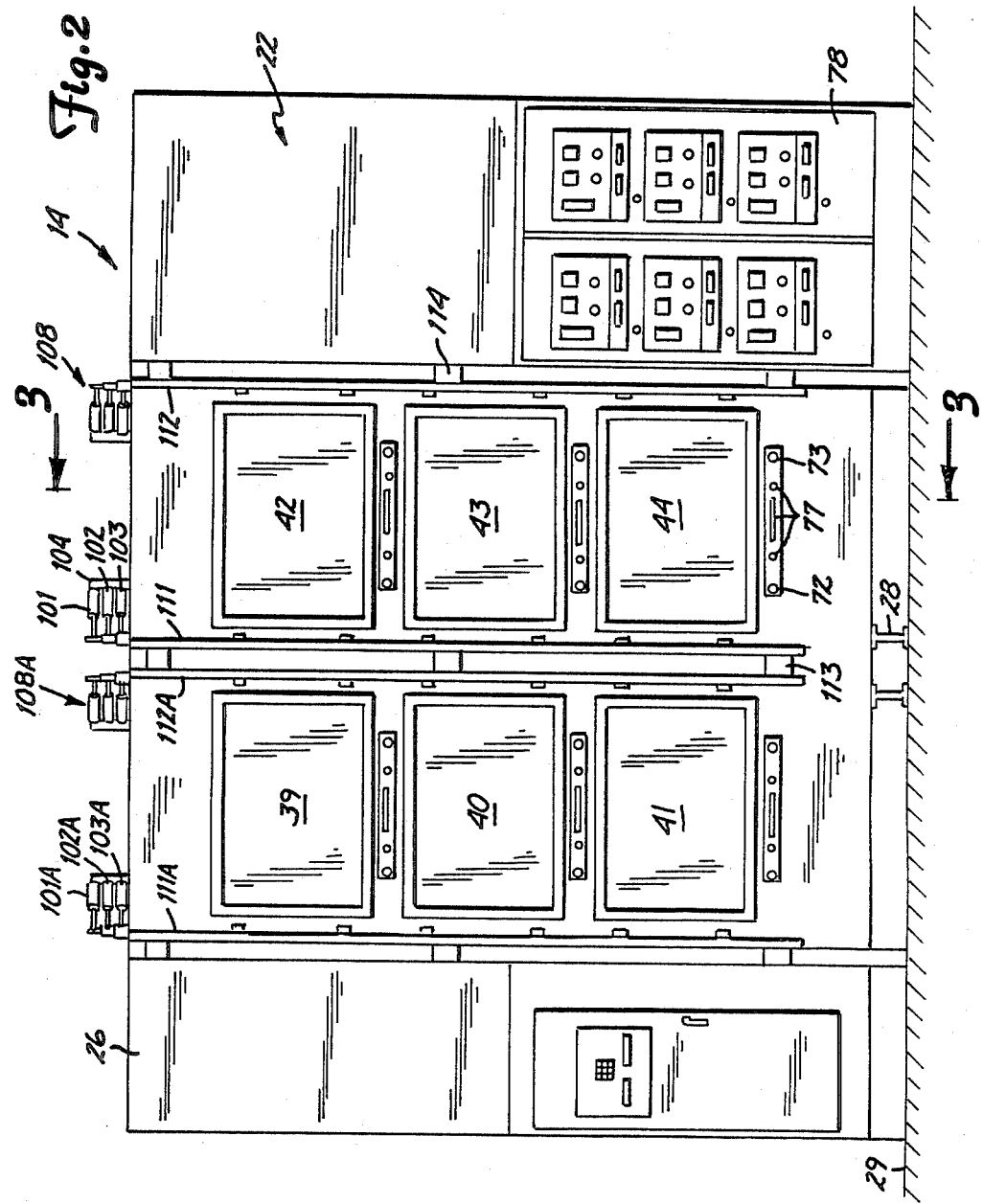
FIG. 2 is an enlarged front view taken along line 2—2 of FIG. 1.
Figure 3:
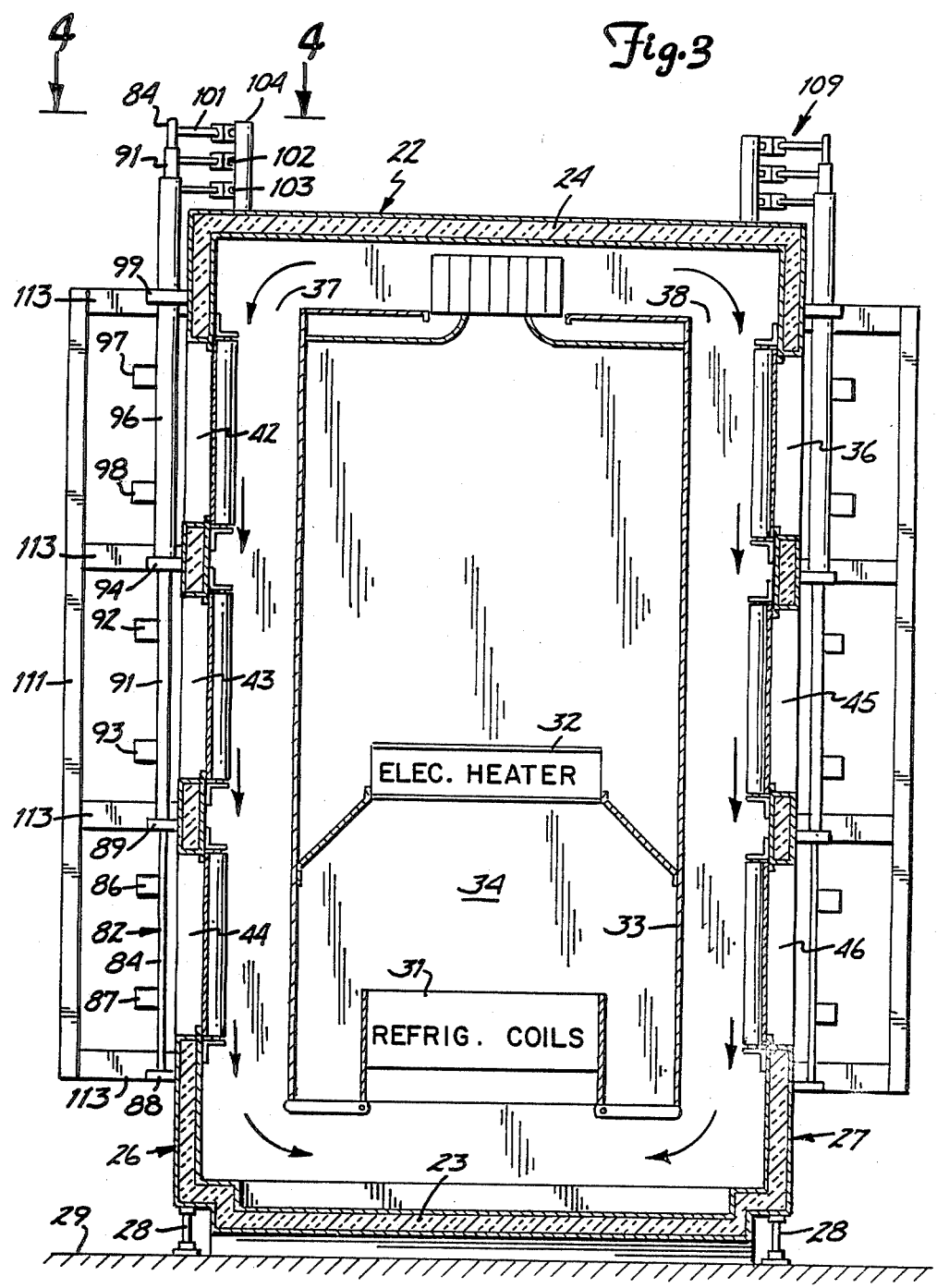
FIG. 3 is an enlarged sectional view taken along line 3—3 of FIG. 2.
Figure 6:
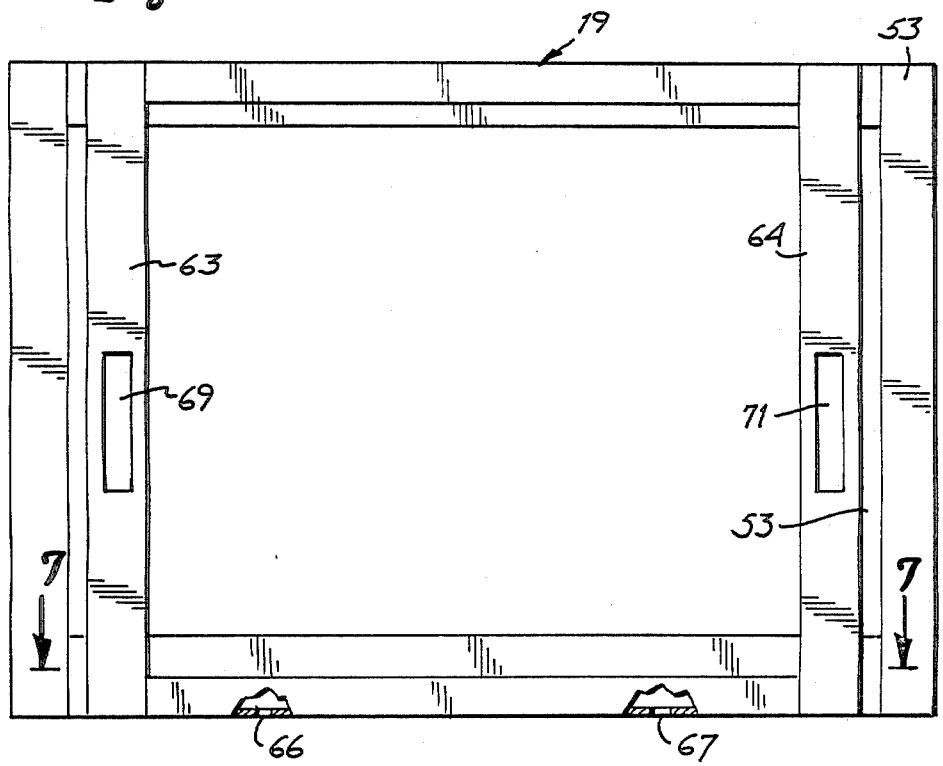
FIG. 6 is an enlarged rear elevational view of the product carrier.

Referring to FIGS. 2 and 3, test station 12 has a box-shaped enclosure or housing indicated generally at 22 comprising a bottom wall 23, a top wall 24 and upright laterally spaced side walls 26 and 27. All of the walls 23, 24, 26 and 27 are insulated to minimize heat transfer to and from the housing. A plurality of leveling blocks 28 engage the lower ends of the side walls 26 and 27 and a support 29, such as a floor, to hold housing 22 in a generally upright position on floor 29. Housing 22 has an internal flue passage 34 formed by walls 33 and accommodating an electric heater 32 therewithin. Heater 32 operates to heat the air in the flue passage and to maintain a selected temperature within passage 34. The flue casing walls 33 direct hot air from heater 32 upwardly toward top wall 24. Flue casing 33 is spaced inwardly from the top, bottom and side walls of housing 22. The space between the casing 33 and the side walls 26 and 27 of housing 22 form generally upright passages 37 and 38 which allow for the downward or return flow of air to heater 32. The hot air continuously circulates through passages 37 and 38 and flue passage 34.

Figure 11:
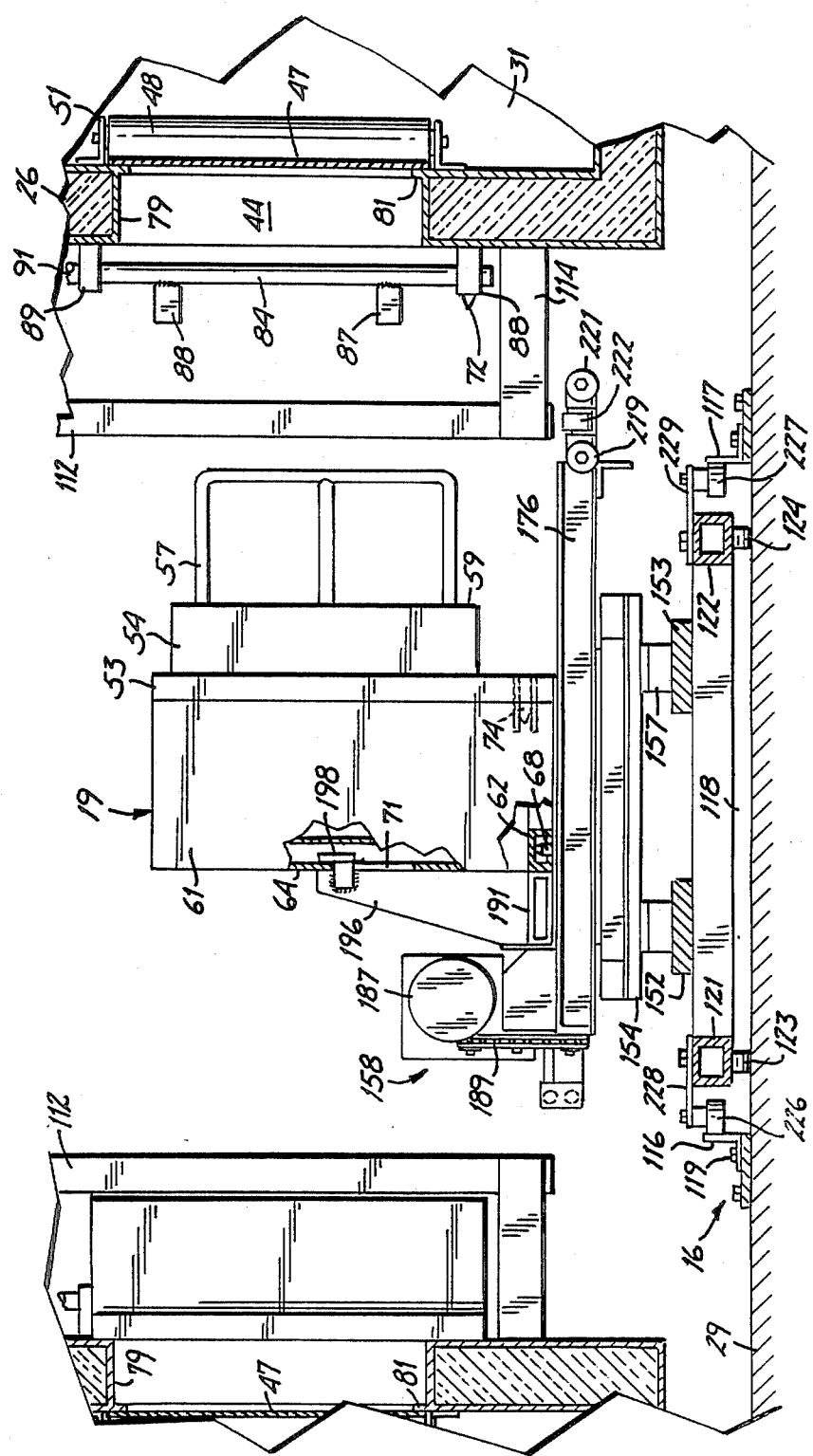
FIG. 11 is a transverse end view of the vehicle, product transfer assembly and product carrier aligned with an opening of a test station.

As shown in FIG. 2, side wall 26 has vertical rows of windows or openings 39, 40, 41 and 42, 43 and 44. Each opening has a generally rectangular shape and is open to passage 37 and the outside atmosphere adjacent housing 22. Side wall 27 has the same rows of openings. As shown in FIG. 3, openings 36, 45, and 46 in side wall 27 are laterally aligned with openings 42, 43, and 44 in side wall 26. Each of openings 36 and 39 to 46 are closed with a screen, shown as a sheet member 47 in FIGS. 2, 3, 11 and 12. The screen across typical opening 44 is herein described. Referring particularly to FIGS. 11 and 21, sheet member 47 extends across opening 44 in side wall 27. Sheet member 47 is trained about rollers 48 and 49 rotatably mounted on brackets 51 and 52 respectively secured to the inside of side wall 27 adjacent the top and bottom of opening 44. Rollers 48 and 49 have spring biasing mechanisms (not shown) which hold the sheet member 47 in a taut position adjacent the inside of the opening 44. Rollers 48 and 49 allow sheet member 47 to be moved inwardly into chamber 31 to position a plurality of electronic components in the flow path of the hot air flowing in passage 37.

Figure 12:
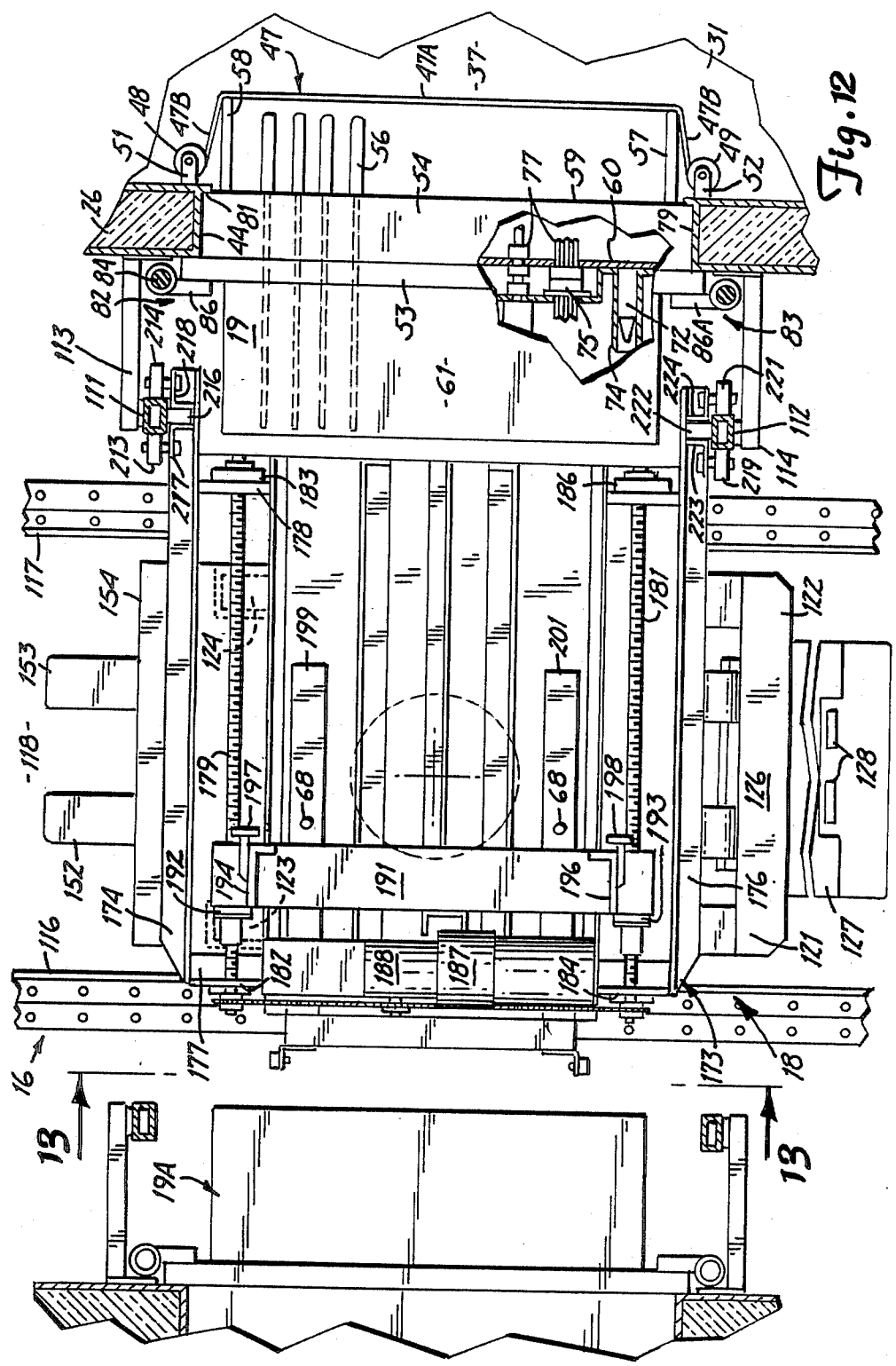
FIG. 12 is a top plan view partly sectioned of the vehicle, product transfer assembly located between opposite test stations and product carrier locked on a test station.

Referring to FIG. 12, product carrier 19 has a peripheral generally rectangular frame 53 secured to a plug assembly 54. As shown in FIG. 5, plug assembly 54 has a plurality of slots 55 in the front face thereof to accommodate product holders 56 used to locate electrical components in front of plug assembly 54. A pair of side arms 57 and 58 project forwardly from opposite sides of plug assembly 54. Side arm 57, as shown in FIGS. 5 and 11, is a generally reverse E-shaped rod. Side arm 58 has the same shape as side arm 57. Side arms 57 and 58 are located on opposite sides of product holders 56 and engage screen 47 when product carrier 19 is mounted on test station 12.

Figure 7:
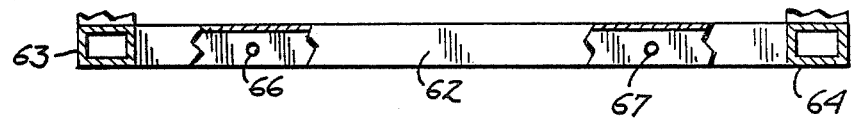
FIG. 7 is a foreshortened sectional view taken along line 7—7 of FIG. 6.
Figure 8:
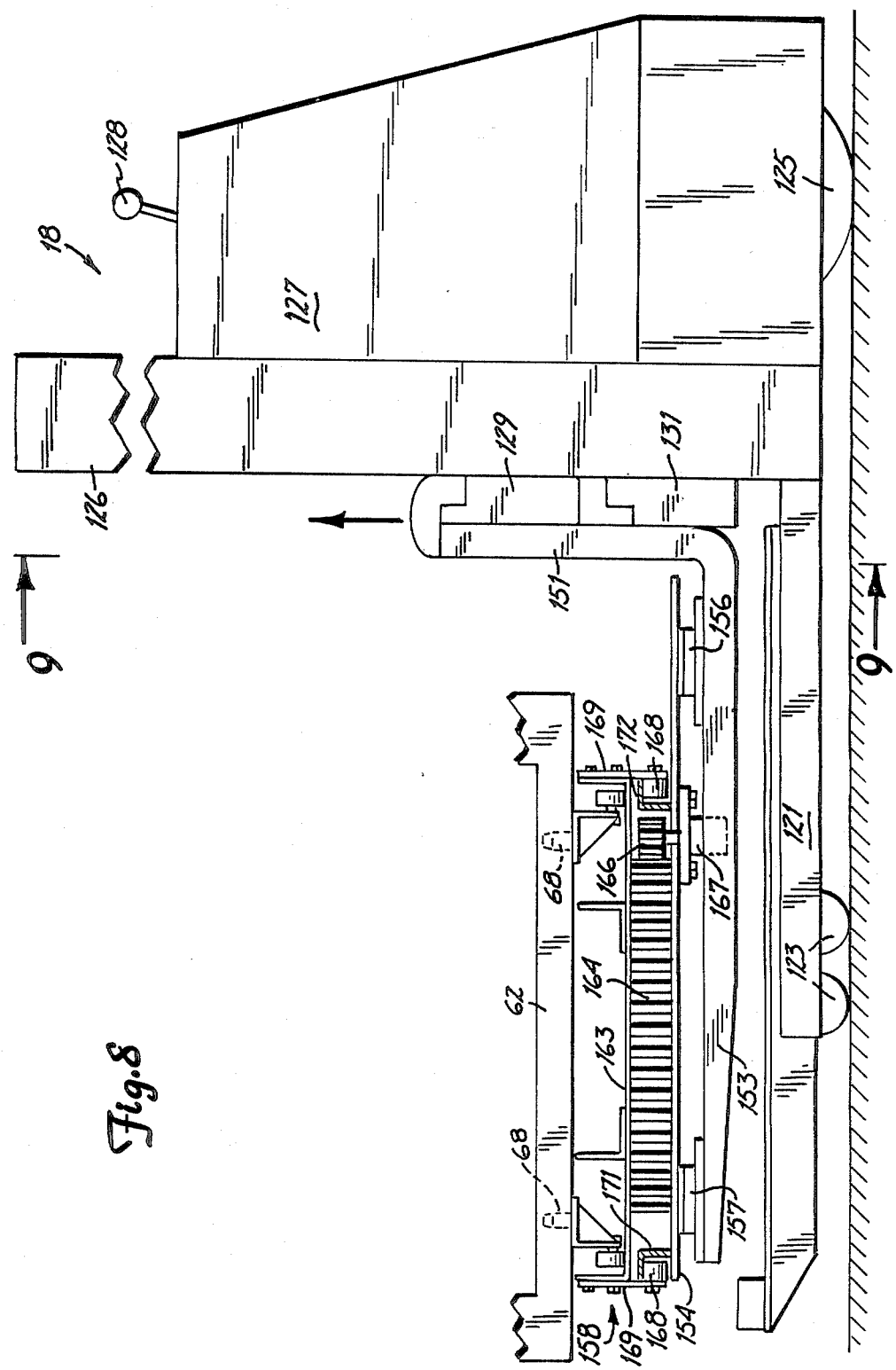
FIG. 8 is a foreshorted side view of the vehicle, product transfer assembly, and product carrier.

A housing 61 secured to the rear side of frame 53 has a base beam 62 and upright posts 63 and 64 secured to opposite ends of base beam 62. As shown in FIGS. 7 and 8, base beam 62 has a pair of holes 66 and 67 to receive location pins 68 carried by vehicle 18. Pins 68 retain and align product carrier 19 on the product transfer assembly 158.

A pair of fixed pins 72 and 73 support and align product carrier 19 on side wall 27. The lower portion of frame 53 has a pair of sockets 74 and 76 to accommodate pins 72 and 73 when product carrier 19 is mounted on side wall 27. A plurality of electrical connectors 77 are located between pins 72 and 73. Mating connectors 75 are mounted on frame 53. The connectors 75 are electrically connected to a control panel or console 78 having separate control stations associated with each of the openings 39–44. The control console 78 includes electrical circuits, power supplies, meters, and switches that are used to supply power to the electrical components being tested. Console 78 also has means to monitor the operation of the electrical components and failure thereof and collect and store product failure data. Console 78 can be coupled to a remote computer and data bank used to record and retrieve test information about the tested products and environment within housing 22.

As shown in FIGS. 11 and 12, a rectangular door frame 79 is located in opening 44. Door frame 79 has an inwardly directed inside lip 81 that is engaged by the forward end of flange 59 of the product carrier 19. Lip 81 and frame 53 provide stops to limit inward movement of product carrier 19 into housing 22. Product carrier 19 is held on wall 27 with a pair of releasable lock devices indicated generally at 82 and 83. The lock devices 82 and 83 are identical in structure and operate to retain frame 53 in engagement with the wall 27. Returning to FIG. 3, lock device 82 comprises an upright rod 84 supporting a pair of holding arms 86 and 87. Rod 84 is rotatably mounted on a pair of brackets 88 and 89 (FIG. 11) secured to the outside of wall 27. A fist tube 91 supporting a pair of outwardly directed locking arms 92 and 93 is rotatably mounted on the mid section of side wall 26 with bracket 94. A second tube 96 is rotatably mounted over tube 91. Tube 96 has a par of outwardly directed locking arms 97 and 98. A top bracket 99 rotatably mounts tube 96 to the top of wall 27.

Rod 84 and tubes 91 and 96 are separately rotated with linear actuators 101, 102, and 103. Linear actuators 101, 102 and 103 located on top of housing 22 are mounted on an upright post 104. Referring to FIG. 4, linear actuator 101 is a position and cylinder assembly having a piston rod 106 connected to a crankarm 107. On expansion of the actuator 101, the crankarm 107 will rotate rod 84 and move the locking arm 86 from the open position as shown in full lines to a lock and holding position as shown in broken lines in engagement with frame 53 of product carrier 19. Both locking arms 86 and 87 are retained in their holding position by linear actuator 101. Linear actuator 102 is operatively connected to the upper end of pipe 91 and is operable to rotate pipe 91 to move locking arms 92 and 93 from their open positions to their closed clamping positions to retain a product carrier in opening 43. The third linear actuator 103 is operatively connected to the upper end of second tube 96 and is operable to rotate the tube 96 to move locking arms 97 and 98 from their open positions to their closed holding positions to retain product carrier in the opening 42. Linear actuators indicated generally at 108 are operable to move the locking arms located on the right side of openings 42, 43 and 44 as shown in FIG. 2 to their holding positions whereby the product carriers located in each of the openings is held in fixed relation on wall 27. Referring to FIG. 3, a plurality of linear actuators indicated generally at 109 are operable to move the locking means on the right side of housing 22 between their open and holding positions.

Returning to FIG. 2, a pair of upright rails 111 and 112 are located adjacent opposite sides of each of the openings 42, 43 and 44. A plurality of support 113 attached to side wall 26 hold the rail 111 is a generally upright position in front of the side wall 26. Rail 112 is connected to side wall 26 with supports 114. Separate pairs of upright side rails, such as rails 111A and 112A, are located on opposite sides of openings 39, 40, 41 in side wall 26. The pairs of rails for each of the test stations 11 to 14 on opposite sides of the housing are shown in FIG. 1.

A pair of laterally spaced guide rails 116 and 117 (FIGS. 11 and 12) establishing pathway 118 extend adjacent the sides of the test stations 11–14. The guide rails 116 and 117 are right angled members that are secured to the floor 29 with fasteners such as conventional bolts 119.

Vehicle 18, as shown in FIG. 8, located between guide rails 116 and 117 moves along the path of path 16. Vehicle 18 has a pair of forwardly directed arms 121 and 122 supporting a plurality of rollers 123 and 124. The rear ends of arms 121 and 122 are secured to an upright mast 126 located adjacent an engine housing 127. The top of engine housing 127 has a plurality of hand controls 128 that are used to control the movement of vehicle 18 in path 118. Vehicle 18 has a steering and drive wheel 125 that is driven with an electric motor or an internal combustion engine.

Figure 9:
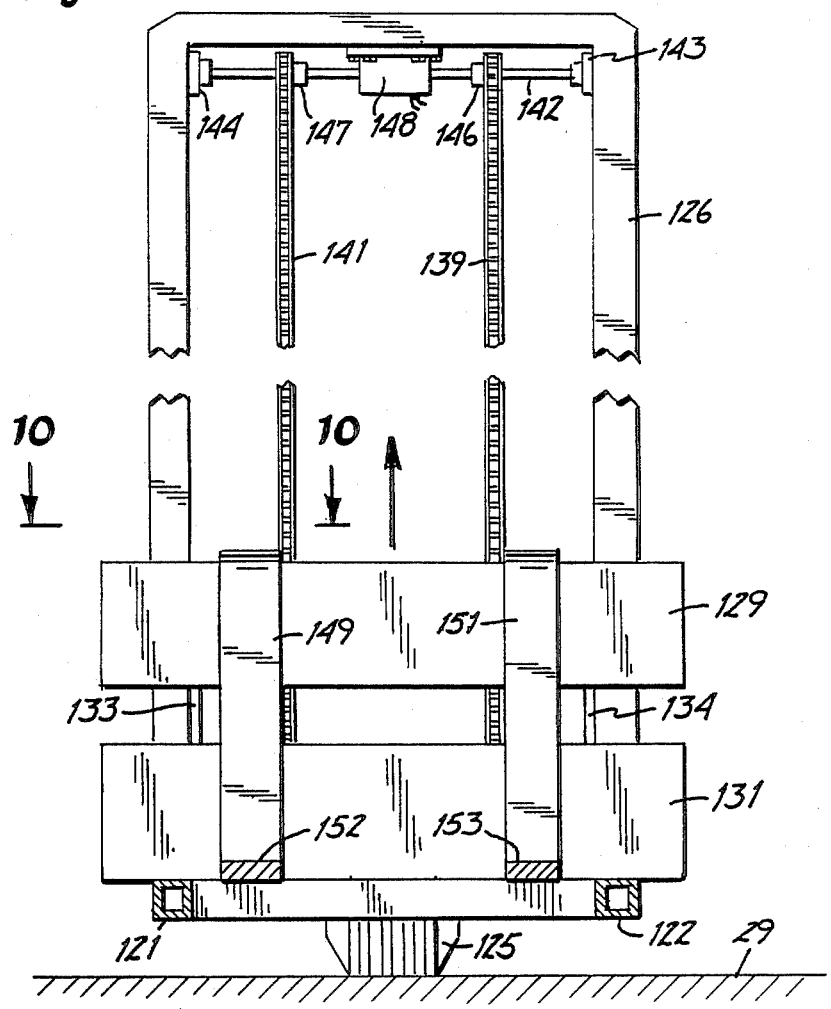
FIG. 9 is a foreshortened sectional view taken along line 9—9 of FIG. 8.
Figure 10:
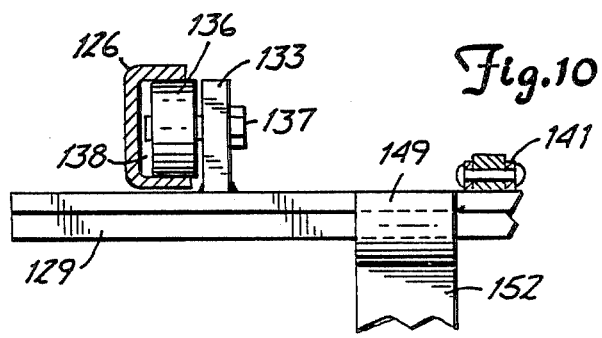
FIG. 10 is an enlarged sectional view taken along line 10—10 of FIG. 9.

As shown in FIG. 9, a pair of transverse fork carriers 129 and 131 are located in front of mast 126. Carriers 129 and 131 are secured to a pair of upright plates 133 and 134 extended adjacent the insides of the upright frame members of mast 126. As shown in FIG. 10, a roller 136 is located in channel 138 of mast 126 to guide carriers 129 and 131 along vertical mast 126. An axle secured to plate 133 rotatably supports roller 136. Plates 133 and 134 support a plurality of rollers (not shown) that ride along mast 126. Fork carriers 129 and 131 are attached to a pair of upright endless roller link chains 139 and 141. A transverse shaft 142 is rotatably supported with bearings 143 and 144 on the upper end of mast 126. A pair of sprockets 146, 147 secured to shaft 142 accommodate the upper ends of the chains 139 and 141. A motor 148, such as an electric or hydraulic motor, mounted on the top of mast 126 is drivably connected to shaft 142. The motor 148 can include a gear head to slowly turn the shaft 142. Other types of motors, such as hydraulic motors and hydraulic cylinders can be used to raise the fork carriers 129 and 131 relative to mast 126.

A pair of forks 149 and 151 are hooked onto the fork carrier 129. The forks 149 and 151 have forwardly directed generally horizontal tines 152 and 153 that extend generally parallel and between arms 121 and 122. The product carrier transfer assembly 158 is mounted on tines 152 and 153 with mounts or pads 156 and 157. The product carrier transfer assembly 158 is operable to rotate the product carrier 19 about a generally upright axis as indicated by the arrow 159 in FIG. 5 and to move the product carrier 19 in opposite linear lateral (horizontal) directions as indicated by the arrow 161. The vertical movement of the forks 149 and 151 on operation of motor 148 moves the product carrier 19 in a vertical direction as indicated by the arrow 162.

Returning to FIG. 8, a generally horizontal turntable 163 is located above the base plate 154. A large external spur gear 164 is secured to the bottom of turntable 163. A drive spur gear 166 is located in driving engagement with gear 164. Gear 166 is driven by a motor 167 mounted on the bottom of base plate 154. Motor 167 can include a speed reducer or gear box operble to rotate the gear 164 at a slow speed. Turntable 163 is rotatably supported on base plate 154 with large thrust bearings 168. The outer/upper race carrying turntable 163 thus turns upon the inner/lower race carried by the base plate 154. Operation of motor 167 drives the large spur gear 164 to rotate the product carrier transfer assembly 158 about a vertical axis. Motor 167 is reversible so that the product carrier transfer assembly can be rotated in both clockwise and counterclockwise directions.

Referring to FIG. 12, product carrier transfer assembly 158 has a generally rectangular frame indicated generally at 173 located above the turntable 163. Frame 173 has a pair of generally parallel side members 174 and 176 that are secured together with a cross beam 177 and cross plates 178.

A pair of elongated screws 179 and 181 are located adjacent the insides of the side members 174 and 176. Bearings 182 and 183 rotatably mount screw 179 on cross beam 177 and plate 178. A pair of bearings 184 and 186 rotatably mount screw 181 on the cross beam 177 and plate 178. As shown in FIG. 13, a reversible motor 187, such as an electric motor, connected to a gear box 188 is used to rotate screws 179 and 181. A chain and sprocket drive 189 drivably connects the screws 179 and 181 with gear box 188.

Referring to FIG. 12, a transverse carriage beam 191 extends between the screws 179 and 181 carrying bearing blocks 192 and 193 respectively. A pair of upright posts 194 and 196 are secured to the top of carriage beam 191. Posts 194 and 196 have finger hooks 197 and 198 at the upper ends thereof adapted to be inserted through the holes 69 and 71 in the back of product carrier 19.

A pair of support arms 199 and 201 are located below carriage beam 191 and are secured thereto. The upright pins 68 are secured to the arms 191 and 201 in front of carriage beam 191. Support arms 199 and 201 are located adjacent a horizontal support rib. Rollers rotatably mounted on the arms ride on the ribs. The ribs are secured to the top of turntable 163. Additional pairs of rollers on the arms 199 and 201 movably support the arms on ribs. A cross member extends between arms 199 and 201 to laterally stabilize the arms. A bracket secured to the mid-section of carriage beam 191 extends downwardly therefrom. A pair of guide rollers are rotatably mounted on the bottom of bracket for rotation about generally upright axis on the bracket. The rollers ride on opposite sides of a horizontal flange secured to the mid-section of turntable 163.

Referring now to FIG. 12, first and second guide rollers 213 and 214 engage opposite sides of upright rail 211 carried by wall 26. A third roller 216 engages the inside of rail 111. A pair of brackets 217 and 218 rotatably mount rollers 213, 214, and 216 on the forward end of side member 174. First and second rollers 219 and 221 engage opposite sides of rail 112. A third roller 222 engages the inside of rail 212. Brackets 223 and 224 rotatably mount the rollers 219, 221, 222 on the forward end of the side member 176. The rollers 213, 214, 216 an 219, 221, 222 guide the product transfer assembly in a vertical direction adjacent the front of housing wall 26. The rails and rollers also maintain the product carrier assembly and product carrier transfer assembly in horizontal alignment with the row of opening 42, 43 and 44 in side wall 26 during the vertical movement of the product carrier transfer assembly 158.

Referring to FIG. 11, the vehicle 18 is maintained in a fixed lateral relationship relative to wall 26 by side rollers 226 and 227 positioned in engagement with the upright flanges of guide rails 116 and 117. Plates 228 and 229 secure rollers 226 and 227 to the vehicle arms 121 and 122. Additional side rollers located laterally of arms 121 and 122 facilitate the guiding of vehicle 18 along the path 118.

In use, a product carrier 19 may be loaded on vehicle 18 in the storage area 17 (FIG. 1). Base beam 62 of carrier 19 is located on support arms 199 and 201. Vertical pins 68 fit into holes 66 and 67 and finger hooks 197 and 198 fit into slots 69 and 71 in carrier 19 (FIG. 11). This fixes the position of the carrier 19 on transfer assembly 158. The product carrier 19 supports a number of product holders 56 that contain objects, devices, electrical components and the like to be tested. Vehicle 18 is manually driven along the path 16 and positioned and aligned with one of the test stations, such as station 12 as shown in FIG. 1. Alignment indicators 230 on the pathway 118 adjacent each vertical row of openings will insure that the operator of vehicle 10 properly aligns the product transfer assembly with a test station. Indicator 230 can be an electrical signaling device or a manual marker used by the operator of the vehicle to stop the vehicle in the proper location in front of an opening in the test station.

Turntable 154 is initially rotated to align the forward ends of the side members 174 and 176 with the upright guide rails 111 and 112. As shown in FIG. 11, the guide rollers 219, 221 and 222 are located below the rail 112 when the turntable has been rotated ninety degrees to position the product carrier 19 in vertical alignment with the row of openings 42, 43 and 44 in the side wall 26 of the housing 22. Guide rollers 213, 214 and 216 are located in vertical alignment with the bottom of rail 111.

The lift mechanism of the vehicle 18 is then actuated by operating the motor 148. This raises the forks 149 and 151 and moves both sets of guide rollers up into engagement with the upright rails 111 and 112 as shown in FIG. 12. The product carrier transfer assembly 158 is elevated until the product carrier 19 is in horizontal alignment with the opening 44 in wall 26. The product carrier 19 is then moved forwardly to position the product carrier 19 in opening 44 of wall 26. The motor 187 is operated to simultaneously turn the long screws 179 and 181. The carriage beam 191 and arms 199 and 201 move in a forward direction and position the assembly 54 in opening 44. The side arms 57 and 58 move through opening 44 and engage the screen 47. As shown in FIG. 12, screen 47 is moved out into the passage 37. The front wall 60 secured to frame 53 closes the opening 44. The screen 47 may be of flexible material rolled onto one or more of the rollers 48, 49 so that as the product carrier is inserted in the opening, the screen is unwound from the rollers, as shown in FIG. 12. The central, vertical portion 47A of the screen may, if desired, be rigid, and the side portions 47B may be elastic, or may be rolled on spring-loaded rollers 48, 49 as shown, or may be attached by movable cables or the like to the housing.

The product carrier 19 is held and aligned with the opening 44 by a pair of pins 72 and 73 carried adjcent the opening and which fit into sockets 74 and 76 in the plate 60. The electrical connectors 75 and 77 are thus automatically closely aligned and automatically interconnect with each other thereby electrically coupling the products in the product holders with the electrical circuits and switches associated with the control console 78. The control console 78 may have power supplies, meters and sensors that continuously monitor the integrity and operation of the products during the test procedure. The panels also may include data collection and storage devices that monitor the efficiency and/or failure of each of the tested products.

The product carrier 19 is locked unto wall 26 by closing the lock devices 82 and 83. The linear actuator 101 is operated to move the lock arms 86 and 87 into engagement with the frame 53. A separate linear actuator 108 operates to move the lock arms 86A into engagement with the opposite side of frame 53. The lock devices 82 and 83 retain frame 53 against wall 26 closing opening 44 and located the products in air passage 37.

The product carrier transfer assembly 158 is released from the product carrier 19 by lowering the product carrier assembly. Pins 68 will move out of their respective holes in the base beam 62 of product carrier 19. The finger hooks 197 and 198 will move down into the slots 69 and 71. Motor 187 is then actuated to move the carriage beam 191 and support arms 199 and 201 back to their initial positions as shown in full lines in FIG. 12. The product transfer assembly 158 is then lowered until the guide rollers 213, 214, 216 and 219, 221, 222 and free of the lower ends of the upright guide rails 111 and 112 respectively. The motor 167 that rotates the turntable is then actuated to move the product transfer assembly 158 in longitudinal alignment with the vehicle 18. Vehicle 18 may then be returned to the storage area to pick up another product carrier or used to unload a product carrier from another test station location. The product transfer assembly 158 is operable to swing to the right as shown in full lines in FIG. 12 or to the left to load and unload product carriers from adjacent test stations on either side of the track.

The product carrier 19 is unloaded from the test station by initially moving the vehicle 18 in alignment with the product carrier and openings in the wall 26. The product carrier 19 and product transfer assembly 158 is elevated to locate the pins 68 and finger hooks 197 and 198 in alignment with the product carrier. The guide rollers 213, 214, 216 and 219, 221 and 222 ride on the upright rails 111 and 112 to insure the lateral alignment of the transfer assembly 158 with product carrier 19. The motor 187 is then actuated to move the carrier beam 191 and arms 199 and 201 under the housing 61. The finger hooks 197 and 198 move through the openings 69 and 71 in the back of the product carrier 19. Continued upward movement of the product transfer assembly 158 moves the pin 68 into alignment with their holes 66 and 77 in the base beam 62. The linear actuator 101 is then retracted to release the locking arms 86. The linear actuator 108 is also actuated to release the locking arms 86A. The product carrier 19 is then retracted from the openings 44. This disconnects the electrical connectors 75 and 77 and withdraws the product carrier from the support pins 72 and 73, the screen 47 returning to its position covering the opening 44. When the product carrier 19 is fully retracted to the position as shown in FIG. 11, the turntable is then rotated back to its longitudinal position. Vehicle 18 is then moved to the storage location where the product carrier 19 is removed and replaced with a new product carrier.

When the product carrier is properly mounted in an opening as described above, the hot air flowing upwardly in passage 34 flows behind screen 47 past the product holders 56 since there are no upper and lower obstructions which interfere with the flow of air in passage 37 past screen 47. The hot air flowing downwardly in passage 37 is continuously circulating and has a substantial uniform temperature to provide effective thermal stress on the products. There is minimum temperature differential from the first to last product and a minimum soak time for the product to reach the stress temperature. There is a uniform, repeatable, thermal stress condition at each product location. When it is desired to expose products to lower than ambient temperatures, the refrigeration coils shown at 31 in FIG. 3 may be actuated.

While there has been shown and described an embodiment of the product testing system of the invention, it is understood that changes in the structure, arrangement of structure, and environment to be tested may be made by those skilled in the art without departing from the invention. The invention is defined in the following claims.

What is claimed is:

1. An apparatus for exposing products to selected environmental conditions comprising: product carrier means for holding at least one product, housing means having an internal chamber and an opening open to said chamber to receive the product carrier means to locate the product in said chamber, means for controlling the environmental conditions in said chamber, said product being subjected to said environmental conditions when located in said chamber, a vehicle for transporting the product carrier means to and from said housing means, said vehicle having a transfer assembly adapted to be connected to the carrier means, first means for moving the transfer assembly in a generally upright direction, second means for rotating the transfer assembly about an upright axis, and third means for moving the transfer assembly laterally in a generally horizontal direction to selectively move the product carrier means into and out of said opening in the housing means, guide means secured to the housing means adjacent the opening therein, and guide engagement means on the transfer assembly engageable with the guide means to guide the transfer assembly along the guide means to locate the product carrier means in alignment with the opening.

2. The apparatus of claim 1 including lock means carried by the housing means to hold the product carrier on said housing means and retain the product in the chamber.

3. The apparatus of claim 2 wherein said lock means includes rod means rotatably mounted on said housing means adjacent said opening therein, arm means secured to the rod means engageable with said carrier means, and power means connected to said rod means operable to move said arm means into engagement with the carrier means to hold the carrier means on the housing means.

4. The apparatus of claim 1 wherein the means for controlling the environmental conditions in said chamber includes means controlling the temperature within said chamber.

5. The apparatus of claim 1 wherein said housing means includes upright wall means, said opening being located in said upright wall means, and wherein said guide means comprises upright rails secured to the wall means, said guide engagement means on the transfer assembly being engageable with said rails.

6. The apparatus of claim 5 wherein guide engagement means comprises roller means adapted to roll on said rails.

7. The apparatus of claim 1 including movable screen means extending across said opening, means resiliently mounting the screen means on the housing means, said screen means being movable into the chamber when the carrier means is inserted into the opening.

8. The apparatus of claim 1 wherein said carrier means includes a plug assembly sized to fit into said opening and a frame projecting outwardly of the plug assembly adapted to engage said housing means, said lock means being engageable with said frame to hold the frame against the housing means.

9. The apparatus of claim 1 including track means located adjacent said housing means and defining a path for said vehicle and means on said vehicle engageable with the track means for guiding the vehicle relative to the track means in said path.

10. The apparatus of claim 1 particularly adapted for testing of an electronically operable product and including means for connecting an electric power supply to said product to monitor electronic operation of the product when exposed to said selected environmental conditions.

11. An apparatus for exposing products to selected environmental conditions comprising carrier means for holding at least one product, housing means having an internal chamber and an opening open to said chamber and adapted to releasably receive through the opening the product carrier means and locate the product in said chamber, means for controlling environmental conditions in said chamber, said product being subjected to said environmental conditions, and lock means engageable with said carrier means to hold the carrier means on said housing means and retain the product in said chamber.

12. The apparaus of claim 11 wherein said housing means includes upright wall means, said opening being located in said upright wall means.

13. The apparatus of claim 11 wherein the means for controlling the environmental conditions in said chamber includes means operble to control the temperature of air in said chamber.

14. The apparatus of claim 11 wherein said carrier means includes a plug assembly sized to fit into said opening, and a frame projecting outwardly of the plug assembly adapted to engage said housing means, said lock means being engageable with said frame to hold the carrier means on said housing means.

15. The apparatus of claim 11 including movable screen means extending across said opening, means mounting the screen means on the housing mears, said screen means being moved into the chamber when the carrier means is inserted into the opening.

16. An apparatus for exposing products to selected environmental conditions comprising product carrier means for holding at least one product, housing means having an internal chamber and an opening open to said chamber to receive through said opening the product carrier and to locate product in the chamber, chamber including screen means extending across and closing the opening, and mounting means mounting the screen to the chamber and allowing the screen to be displaced inwardly of the chamber as the product carrier is received in the opening.

17. An apparatus for exposing products to selected environmental conditions comprising carrier means for holding at least one product, housing means having an internal chamber and an opening open to said chamber and adapted to releasably receive through the opening the product carrier means to locate the product in said chamber, means for controlling environmental conditions in said chamber, said product being subjected to said environmental conditions, and lock means engageable with said carrier means to hold the carrier means on said housing means and retain the product in said chamber, comprising rod means rotatably mounted on said housing means adjacent said opening therein, arm means secured to the rod means and engageable with said carrier means, and power means connected to said rod means operable to move said arm means into engagement with the carrier means to hold the carrier means on the housing means.

18. An apparatus for exposing products to selected environmental conditions comprising product carrier means for holding at least one product, housing means having an internal chamber and an opening open to said chamber to receive therethrough the product carrier and to locate product in the chamber, the chamber including screen means comprising a length of flexible material extending in a vertical plane from one side of the opening to the opposite side, and mounting means mounting the screen to the chamber and allowing the screen to be displaced inwardly of the chamber as the product carrier is received in the opening, the mounting means comprising rollers mounted on one or both sides of the opening and upon which a portion of the flexible material is rolled.

* * * * *